Figure 1:
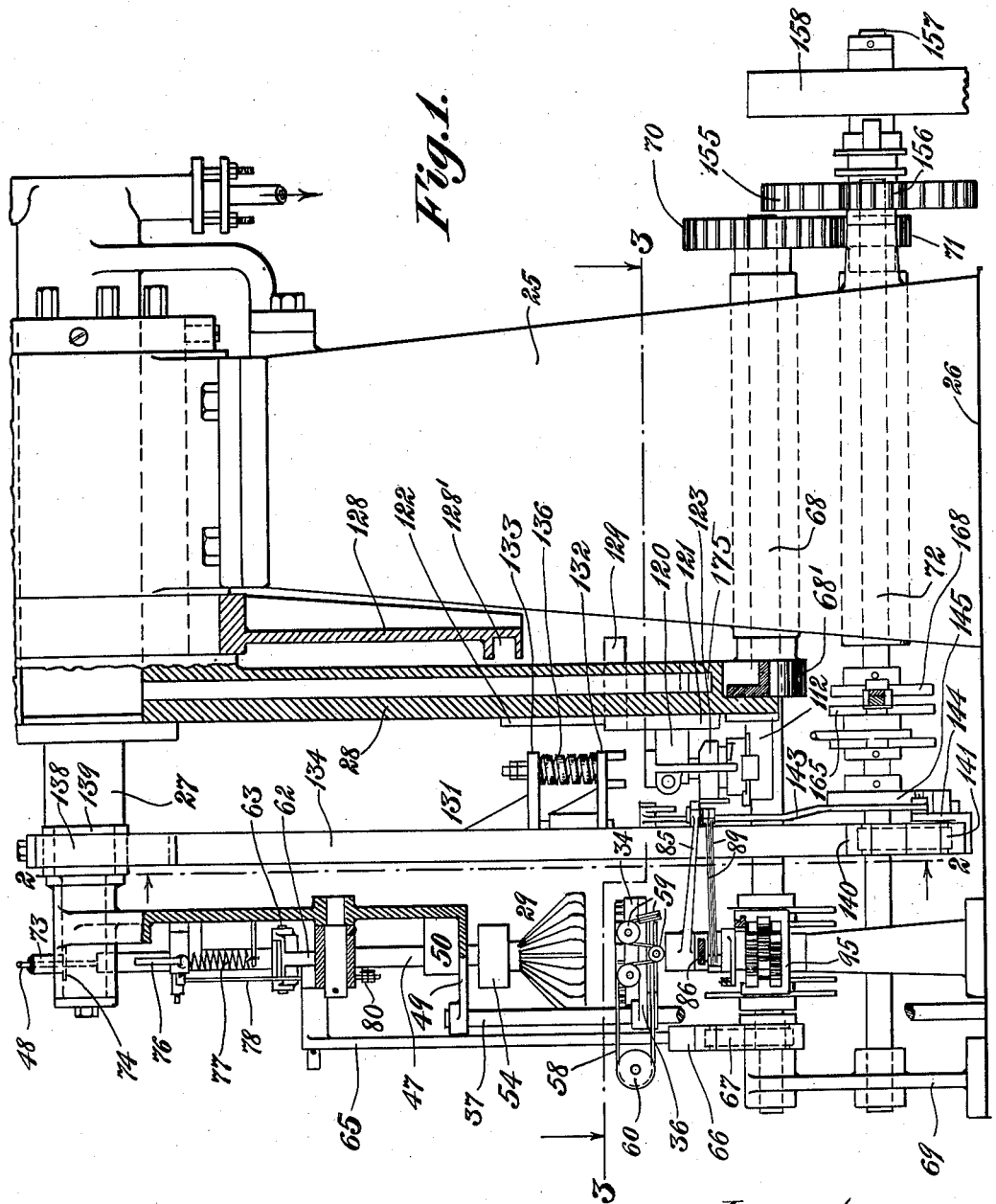

W. E. CLAUSSEN.
MACHINE FOR MAKING RECEPTACLES.
APPLICATION FILED AUG. 19, 1912.

1,103,940.

Patented July 21, 1914.

8 SHEETS—SHEET 1.

Witnesses:

Inventor:
W. E. Claussen
By his Attorneys,

W. E. CLAUSSEN.
MACHINE FOR MAKING RECEPTACLES.
APPLICATION FILED AUG. 19, 1912.

1,103,940.

Patented July 21, 1914.
8 SHEETS—SHEET 2.

Witnesses:

Inventor:
W. E. Claussen
By his Attorneys,

W. E. CLAUSSEN.
MACHINE FOR MAKING RECEPTACLES.
APPLICATION FILED AUG. 19, 1912.
1,103,940.
Patented July 21, 1914.
8 SHEETS—SHEET 3.
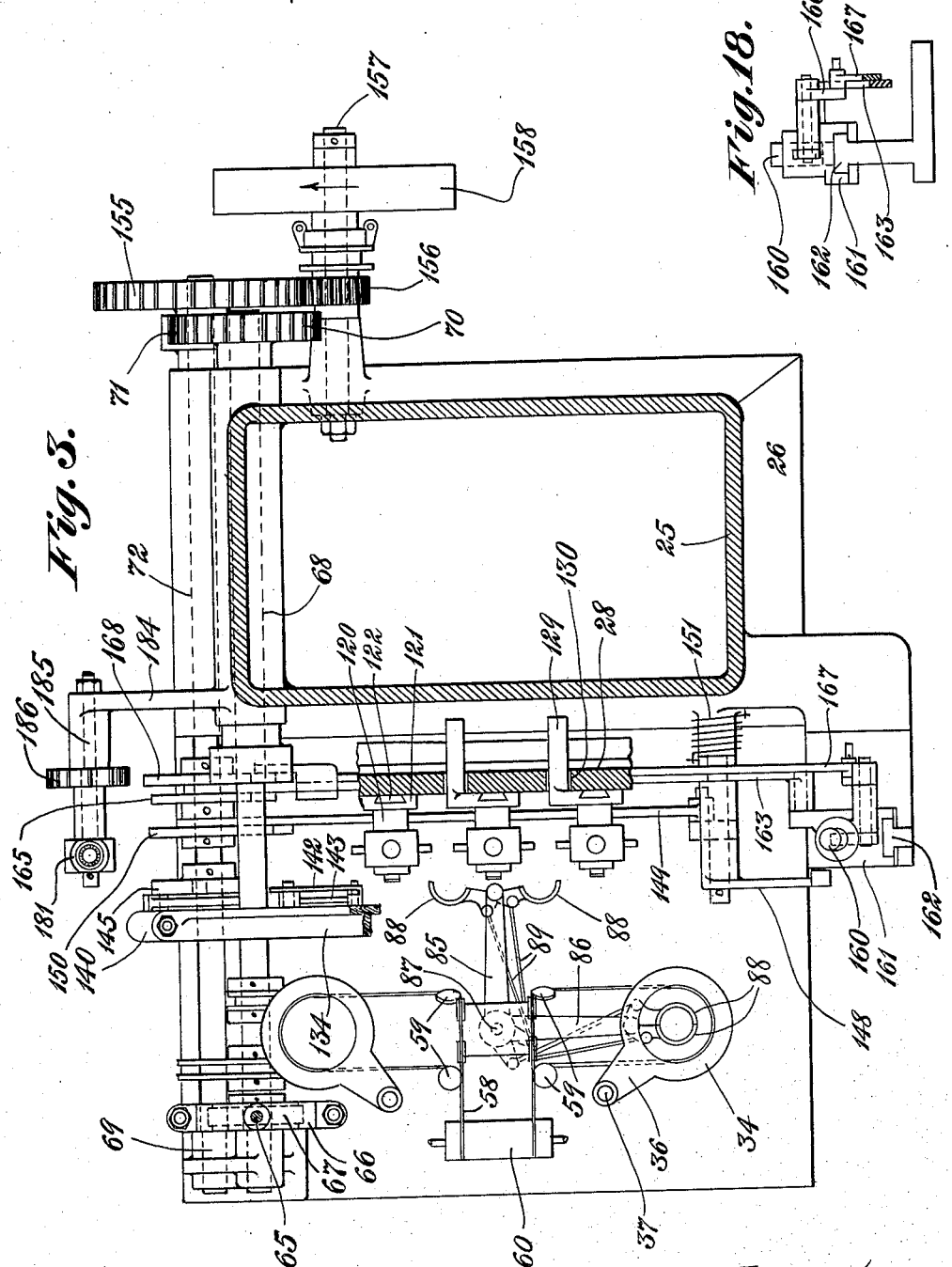

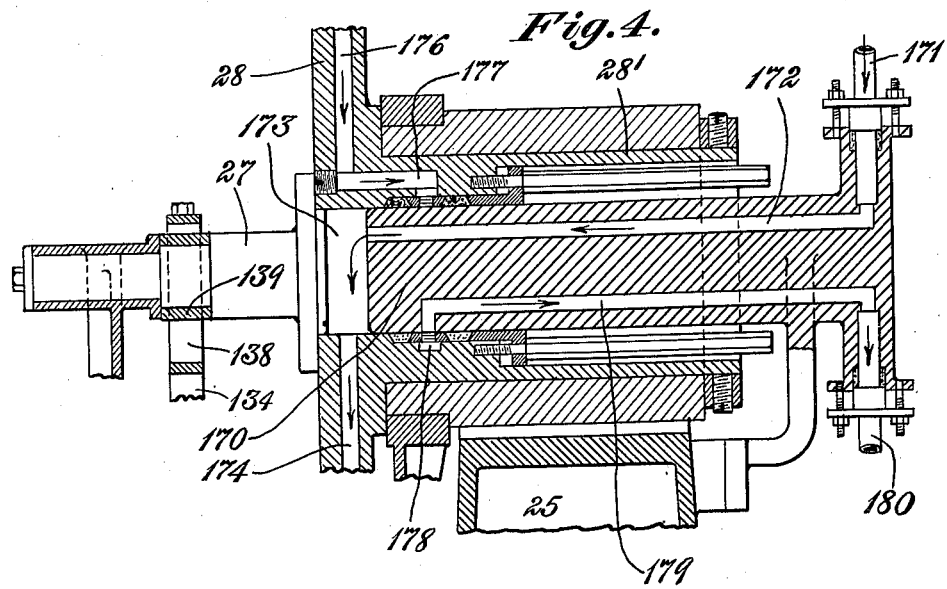

W. E. CLAUSSEN.
MACHINE FOR MAKING RECEPTACLES.
APPLICATION FILED AUG. 19, 1912.
1,103,940.
Patented July 21, 1914.
8 SHEETS—SHEET 5.
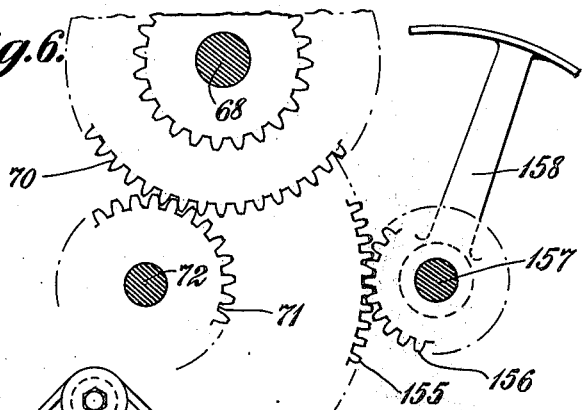
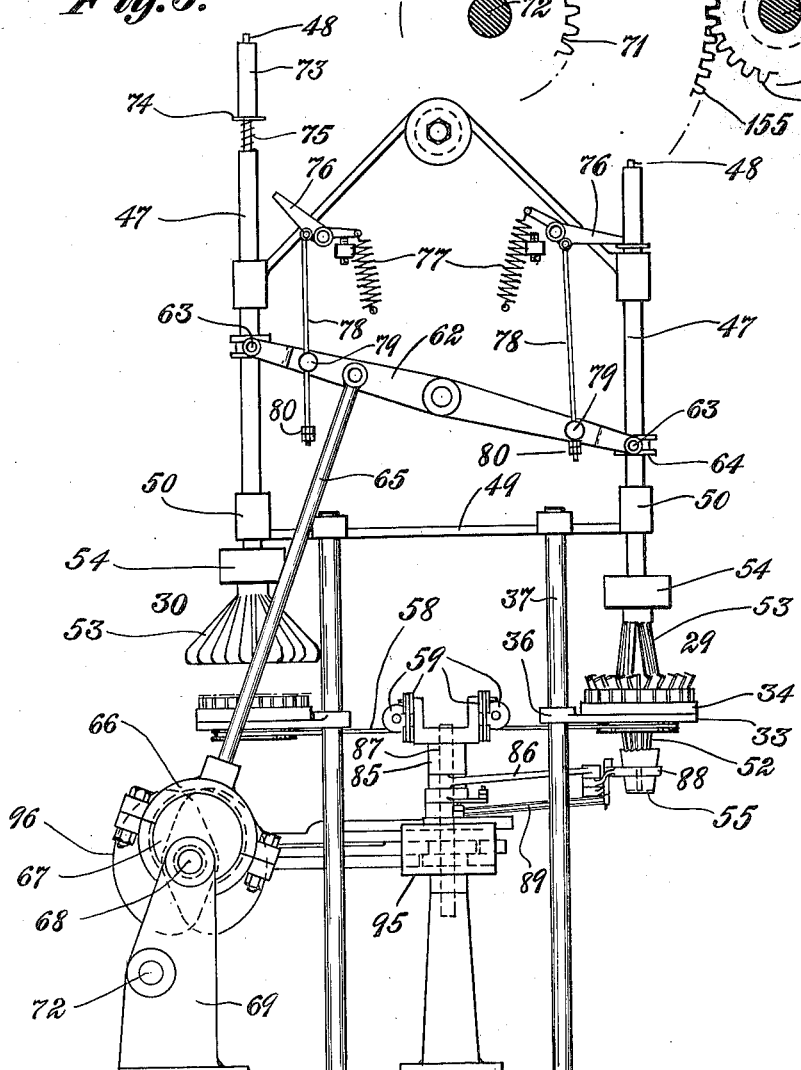
Witnesses:
Inventor:
W. E. Claussen
By his Attorneys, W. E. CLAUSSEN.
MACHINE FOR MAKING RECEPTACLES.
APPLICATION FILED AUG. 19, 1912.
1,103,940.
Patented July 21, 1914.
8 SHEETS—SHEET 6.
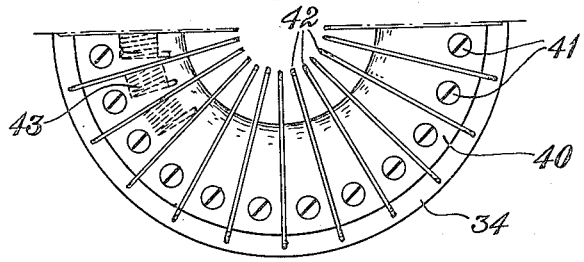
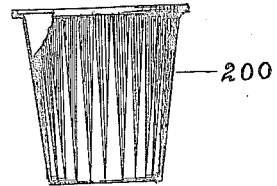
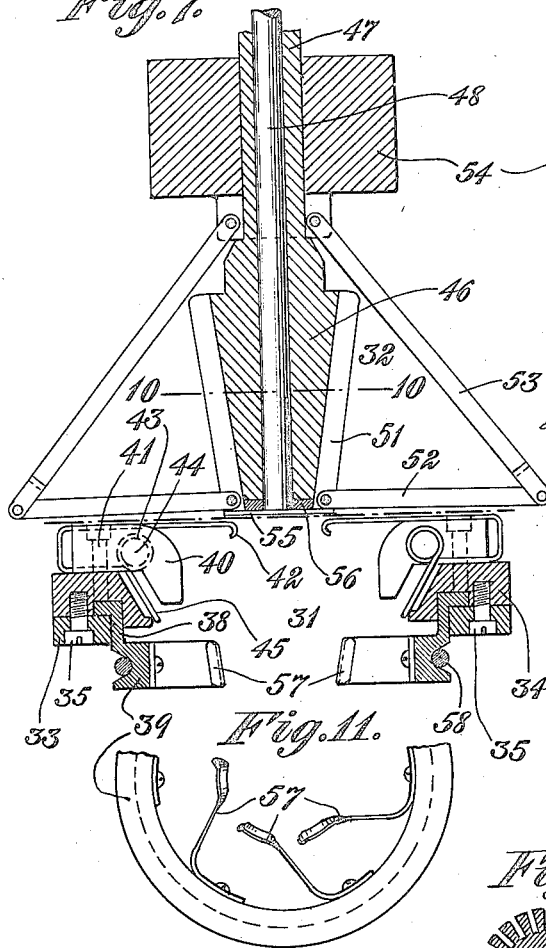
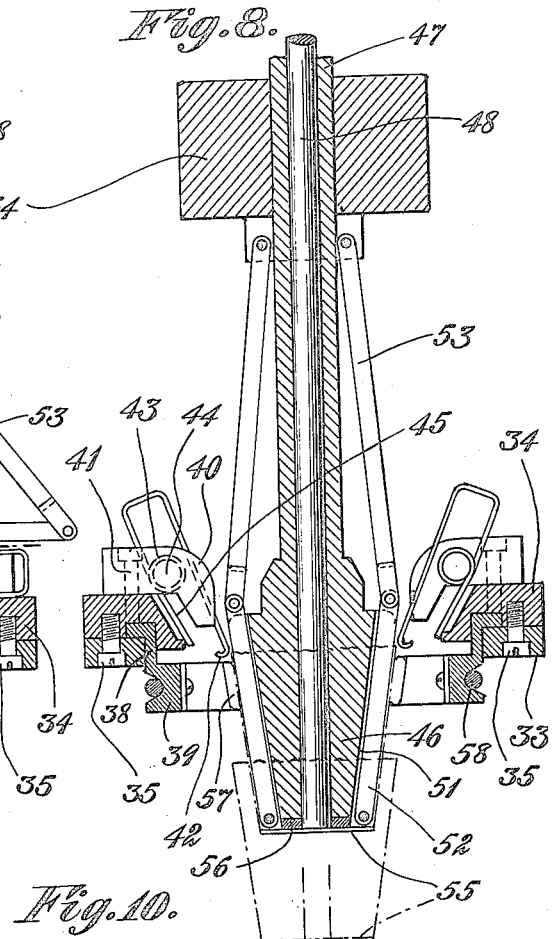
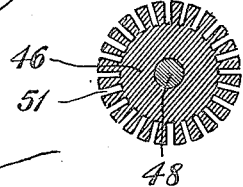
Witnesses:
Inventor:
W. E. Claussen
By his Attorneys,

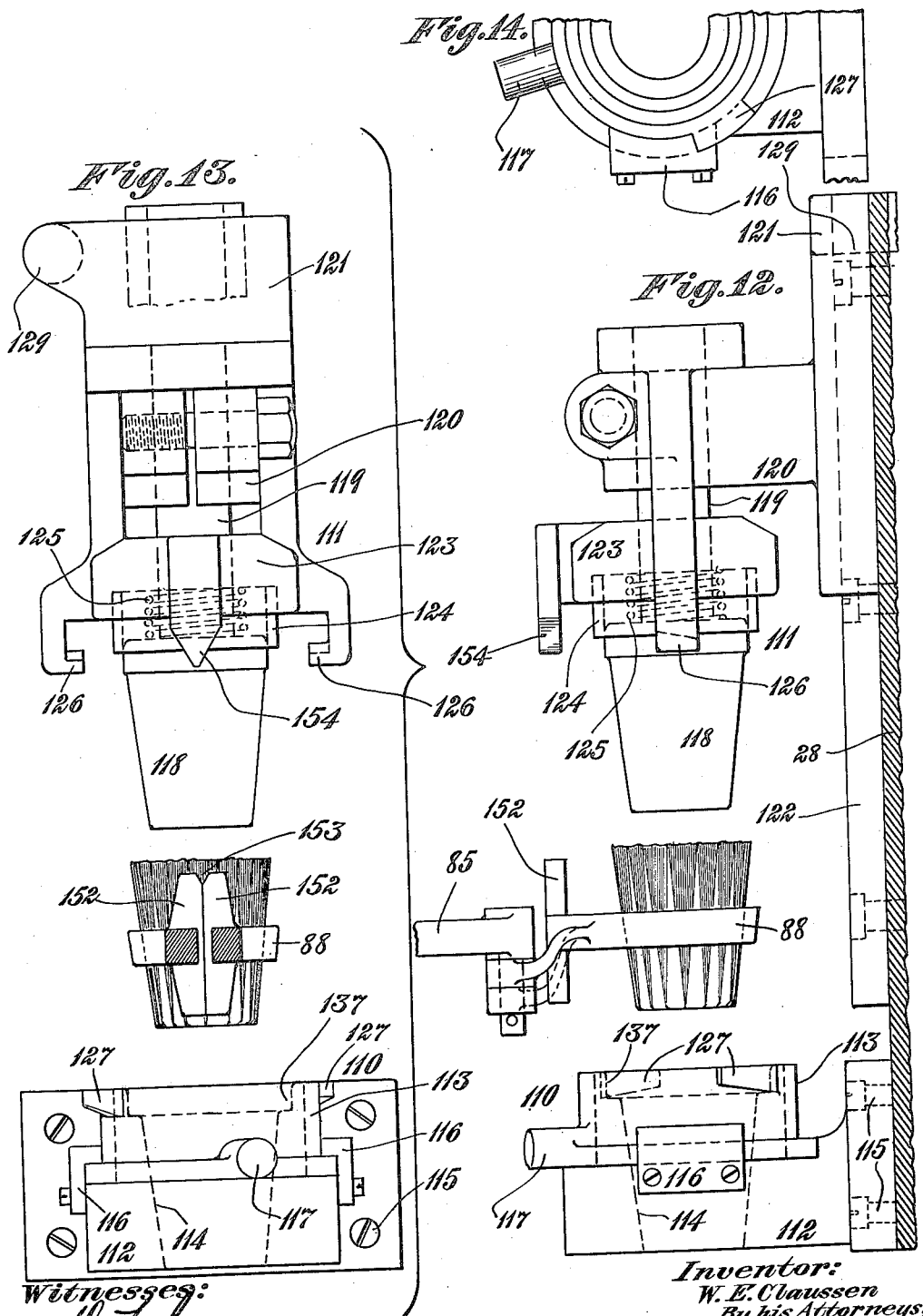

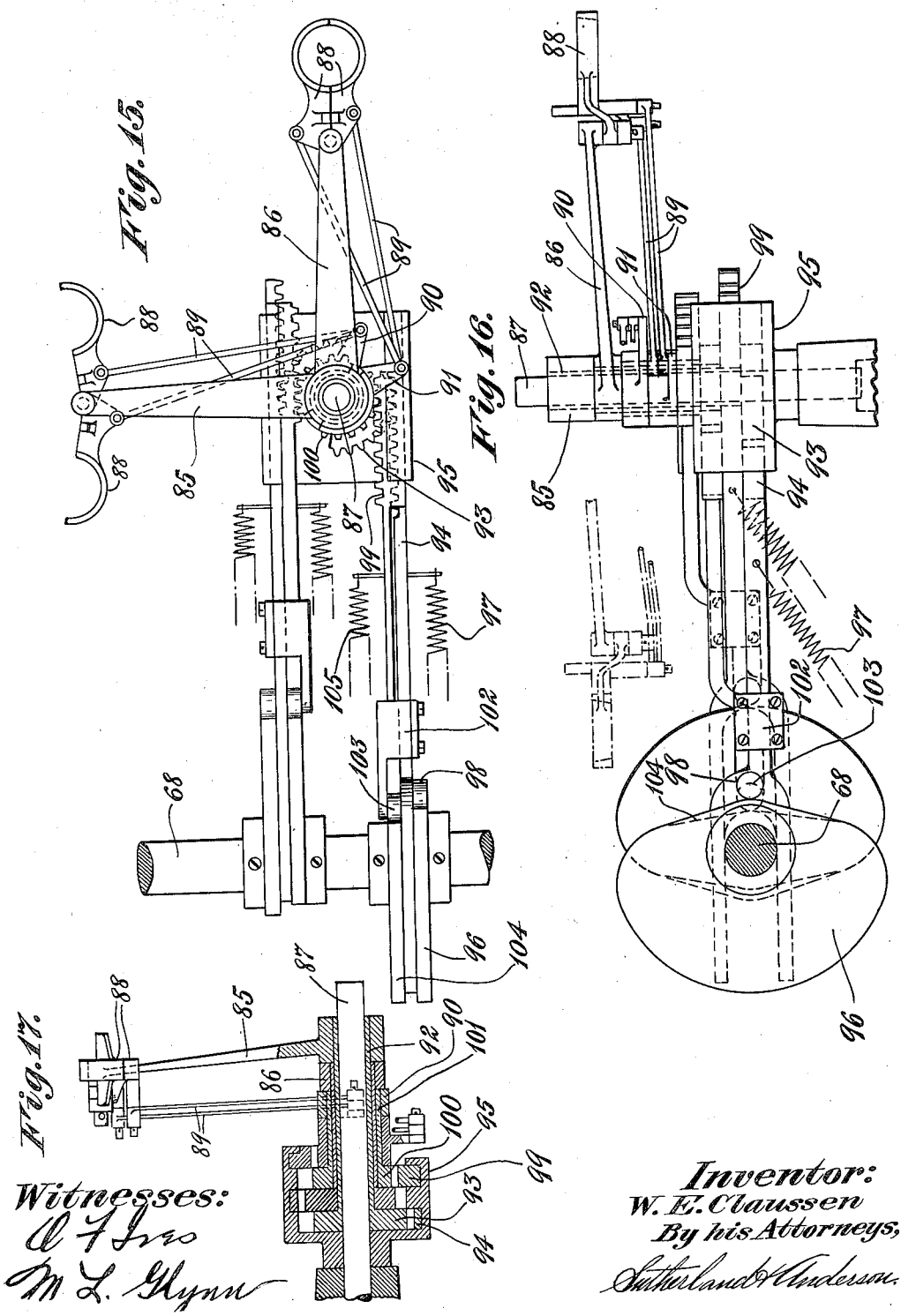

UNITED STATES PATENT OFFICE.

WALTER E. CLAUSSEN, OF NEW YORK, N. Y.

MACHINE FOR MAKING RECEPTACLES.

1,103,940.

Specification of Letters Patent.

Patented July 21, 1914.

Application filed August 19, 1912. Serial No. 715,790.

*To all whom it may concern:*

Be it known that I, WALTER E. CLAUSSEN, a citizen of the United States, residing at New York, in the county of Kings and State of New York, have invented certain new and useful Improvements in Machines for Making Receptacles, of which the following is a specification.

This invention relates to a machine for making receptacles, and while the material from which the receptacles are made, is not a matter of consequence, paper is quite satisfactory in this connection. In like manner the use to which the receptacles are put, is not material, although the machine is organized in the present instance for making paper drinking cups.

Among the objects of the invention are the provision of a machine which is comparatively simple in construction, effective and precise in action and by which receptacles can be quickly and accurately formed.

The invention possesses other features of novelty and advantage which with the foregoing, will be set forth at length in the following description wherein I will describe in detail that one of the several forms of embodiment of the invention which I have selected for illustration in the drawings accompanying and forming part of the present specification, this disclosure being primarily provided to enable those skilled in the art to practise the invention. I wish it, therefore, to be distinctly understood that I do not limit myself to such showing; I may depart therefrom in several respects within the scope of the invention defined by the claims following said description.

Figure 19:
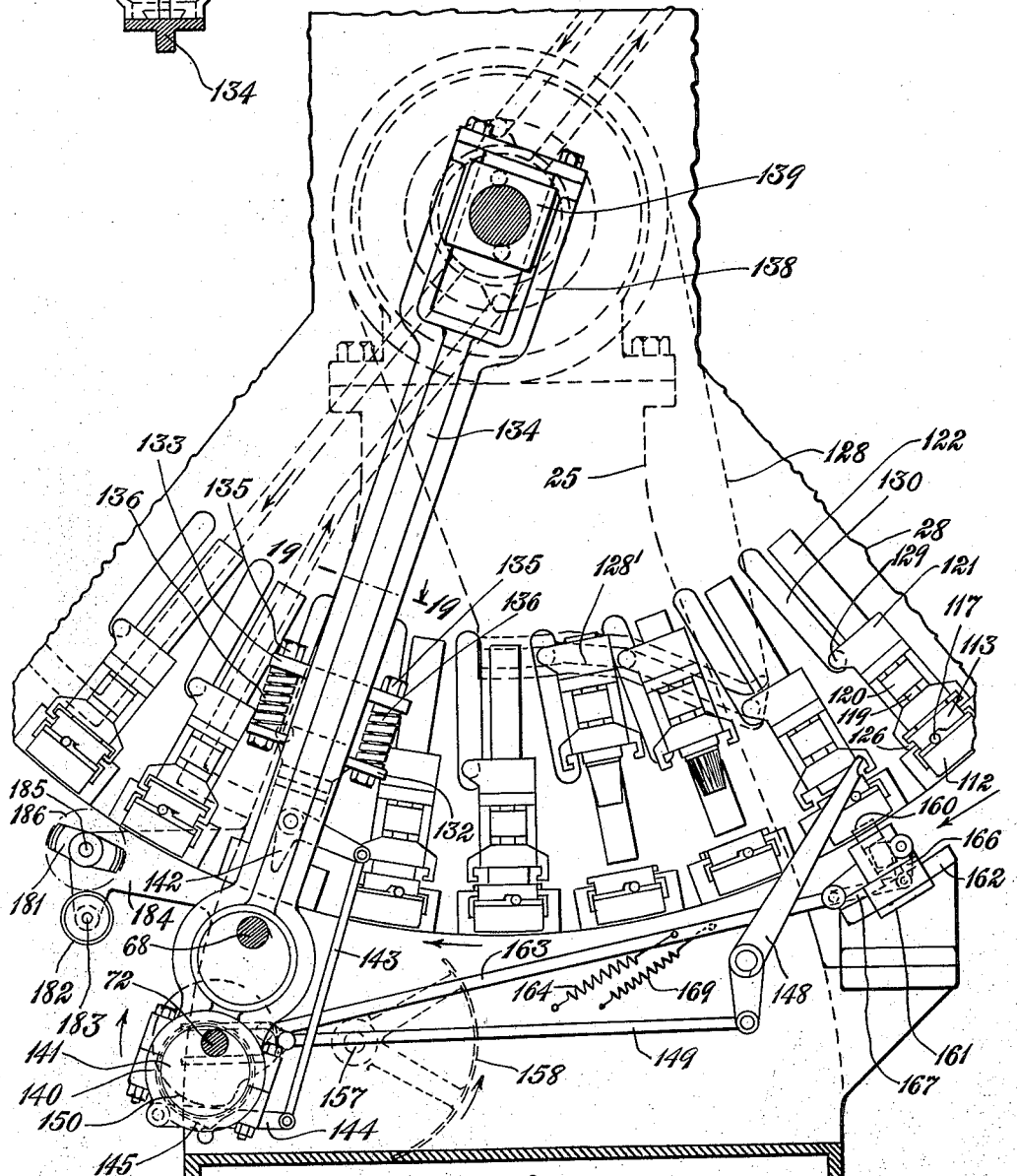
Figure 2:
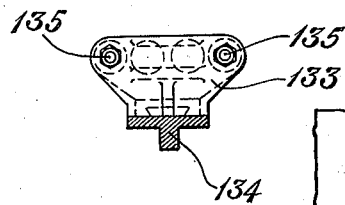

Referring to said drawings: Figure 1 is a side elevation partly in section of a receptacle making machine involving my invention. Fig. 2 is a sectional view on the line 2—2 of Fig. 1, only a portion, however, of the carrier for the dies being illustrated. Fig. 3 is a horizontal section on the line 3—3 of Fig. 1. Fig. 4 is a longitudinal section through the main shaft and the central portion of the carrier for the dies, certain ducts and other parts hereinafter more particularly described. Fig. 5 is an elevation of the plaiting-mechanism and certain coöperating parts. Fig. 6 is a view of the driving-mechanism, the shafts being in section. Figs. 7 and 8 are vertical sectional views of the plaiting mechanism showing the same in different positions. Fig. 9 is a plan view of one half of one of the plaiting-mechanisms. Fig. 10 is a sectional view on the line 10—10 of Fig. 7. Fig. 11 is a plan view of a portion of a plait-flattening member. Fig. 12 is a side elevation partly in section of the principal members of the die mechanism and certain coacting elements. Fig. 13 is a front elevation of the parts shown in Fig. 12, the carrier being omitted. Fig. 14 is a plan view of a portion of the die-locking mechanism. Figs. 15 and 16 are plan and side views of cup-forwarding mechanism and operating means therefor hereinafter more particularly described. Fig. 17 is a sectional view of the same, the section being taken through the supporting-shaft thereof. Fig. 18 is a detail view of the cup-ejector. Fig. 19 is a cross-sectional view on the line 19—19 of Fig. 2, and, Fig. 20 is a detail view of a finished cup.

Like characters refer to like parts throughout the several figures which it will be observed are on different scales.

As already intimated a receptacle made by the machine may be employed with advantage for many different purposes such as for a drinking cup, and as a matter of convenience I will hereinafter refer to the receptacle as a cup. It is not a matter of consequence of what material the cup be composed, although paper is quite satisfactory, the resultant article produced by the machine organized as shown in the drawings, being a paper drinking-cup. In said organization the blank or blanks are given two distinct main operations, (although these may not in all cases be necessary), one being preferably a plaiting operation and the other a dieing operation, plaiting mechanism being provided to act upon a practically flat blank and to form the same into a cup having a flat bottom and a downwardly-tapering, plaited body. The plaited cup-blank is then presented to die mechanism which presses the plaits firmly and substantially together to maintain the shape. It is customary to coat these paper drinking cups with paraffin, and such substance may be applied to the cup or blank at any desired point. These cup blanks may be of any desirable outline, although they are generally circular or paper disks, and are fed one at a time to plaiting mechanism which is preferably duplicated. In my copending application filed June 13, 1912, Serial No. 703,196, I have illustrated a feeding-mechanism, and in said application while I set forth that such feeding mechanism is susceptible of general application, it is of peculiar utility when incorporated in or comprising part of a cup-forming machine such for instance as that constituting the subject matter of the present case.

The framework for sustaining the different parts of the apparatus may be of any suitable character; that shown includes in its make-up a column or standard 25 rising from a base or bed 26. This column 25 (Fig. 1) supports the main shaft 27 to which the carrier 28 is fastened, said carrier in the construction shown consisting of a plate of comparatively large diameter to which the die mechanism is connected and which as will hereinafter appear consists of dies arranged in sets, each set having a relatively fixed or female die member and a movable or male die member.

There are two plaiting-mechanisms 29 and 30 (see for instance Fig. 3). A description of one of these plaiting mechanisms will apply to the other as in the showing made, they are of duplicate construction. It is not necessary in all cases to duplicate the plaiting mechanism or even to employ that shown and hereinafter to be described; Figs. 7 and 8 show best one of the plaiting mechanisms, and these two figures will be described in detail. Said plaiting mechanism involves in its construction two main members such as those denoted in a general way by 31 and 32, the member 31 being relatively stationary and the part 32 being movable. The part 31 comprises superimposed rings 33 and 34 fastened together in some suitable manner as by several screws 35, the member or ring 34 having a substantially radially-extending arm 36 fastened to the upright or rod 37 fastened to and rising from the base or bed 26, and disposed as shown at an outward, inward angle as shown best in Fig. 3. The inner portions of the two rings 33 and 34 receive between them the outwardly extending branch of the substantially inverted L-shaped flange 38 which rises from the marginal portion of the annular member or rotary ring 39, the upper relatively stationary ring 34 being rabbeted to receive and guide said flange 38. The upper ring 34 carries several tongues 40 attached thereto in some suitable manner as by screws 41, said tongues 40 being laterally separated or spaced to provide for slots and the inner ends thereof being bent or curved downward. Through the spaces between the tongeus 40, the resilient fingers 42 are adapted to work, said fingers constituting a temporary support for the blanks (one of which is shown by dot and dash lines in Fig. 7 in flattened condition) the free ends of said spring fingers being rounded or bent so as not to cut or injure the blanks. The shanks of the springs 42 are of practically yoke form, one branch of each being shorter than the other and being coiled as at 43 around pins 44 in the spaces between the tongues 40, the coils 43 having downwardly projecting portions 45 bearing against the inner surface of the stationary ring 34 to prevent accidental movement of said springs. As intimated a blank is fed onto the supporting fingers or springs 42 and centered thereon, after which said blank is given a downward movement at its center so as to make a plaited cup blank and on such downward movement the long branches of the shanks of the springs 42 are swung downward and the short branches thereof upward as indicated in Fig. 8, said long branches during such action entering into the spaces or slots between the tongues 40 and during this time the blank is being plaited or creased, the fingers or springs 42 effectively supporting the blanks during the plaiting or creasing operation.

Associated with the tongues 40 and the yieldable or flexible fingers 42, is a plunger 46 which is approximately frusto-conical in form, practically agreeing in shape with the cup to be made, said plunger 46 constituting a head at the lower end of the tubular shaft 47 supported for sliding movement on the shaft 48. The rods or uprights 37 to which I have referred are connected by a cross piece 49 (see Fig. 5) extending outwardly therefrom and terminating in bearing-sleeves 50 which support the tubular shafts 47 for sliding movement. The plunger or head 46 is shown having a series of peripheral longitudinally-extending slots or channels 51 within which at the lower ends thereof are pivoted the plaiting or creasing members 52 which in the construction shown consist of links or strips. The outer ends of the strips 52 are jointed to links 53 pivoted or otherwise suitably connected with the weight 54 which has a relative sliding movement on the tubular or hollow shaft 47 which in the present instance is integral with the head 46. The shaft 48 has at its lower end a head 55 rigid therewith and of circular or disk form, this disk or head 55 approximately equaling in diameter that of the bottom of the cup to be made and in fact practically shaping said bottom. Normally the disk or head 55 fits against the head 46 or against a soft facing 56 thereon. Should the shaft 48 and therefore the head 55 be given a movement with respect to the head 46, the plaited cup blank can be forced from the head 46 as will hereinafter appear.

The parts of the plaiting mechanism are shown as occupying their primary positions in Fig. 7, a blank having been placed upon the fingers or springs 42 and centered thereon as previously set forth. On the advance initially simultaneously of the shafts 47 and 48, the two heads 46 and 55 are moved downward, and owing to the resistance interposed by the blank, the creasing or plaiting members 52 are caused to swing upward relatively to the head 46 and to be moved into the channels or slots 51. As the two heads 46 and 55 move downward the blank is shaped into tapering form as indicated practically by the dot and dash lines in Fig. 8. As said heads move downward the members 52 press the stock of the blank into the spaces or slots between the tongues or fingers 40 thereby creasing or plaiting the blank, the plaits or creases being disposed exteriorly thereof. When the blank has wholly passed below the rigid tongues 40 and the resilient fingers 42 as indicated by the upper series of dot and dash lines in Fig. 8, it will have a substantially frusto-conical or tapered cup form and will also have a multiplicity of creases or folds which are subsequently flattened down, however, as will hereinafter appear. As the creasing or plaiting members 52 are relatively swung up in the manner indicated the links 53 are also relatively thrust upward, the effect being to maintain the weight 54 always in the same position, so that when the parts move upward, this weight will act positively to close the respective sets of links 52 and 53 or move them toward each other whereby they can be returned to their initial positions at which point the creasing links 52 stand substantially horizontal or practically radially of the creasing or plaiting head 46.

It will be remembered that the ring 39 has been described as being rotary, and this ring in the construction shown is provided with means for flattening down the creases or folds made externally of the cup-blank, and said means as shown consist of springs as 57, the free ends of which are enlarged and slightly concaved, while the butts thereof are rigidly fastened to the inner surface of said rotary ring 39, the free portions of said springs being adapted to wipe across the plaits or folds as the blank is being forced into said ring, to positively and effectually flatten the same, the ring 39 during this time rotating. The ring 39 and the companion ring are rotated by complemental bands or belts 58 extending around suitably-placed guide sheaves 59 supported by bearings on the framework of the machine and also around the power driven drum or roller 60. These belts constitute in part the subject matter of my copending application already referred to. It will be seen that they are bent outward between their ends, and at about the point where they are thus bent outward is a pusher member (not shown) which alternately pushes the paper disks or blanks onto the supporting fingers or springs 42.

It will be clear that if the shaft 48 be operated with respect to the shaft 47, in the construction shown in a downward direction, the head 55 can press against the bottom of the cup-blank to dislodge the same from the plaiting or creasing head 46 as shown by the lower series of dot and dash lines in Fig. 8.

The means shown for endwise-moving and relatively-operating the two shafts 47 and 48 will now be described. Supported by a bearing on the framework of the machine between its ends is the rocker or walking-beam 62 provided with forks at its ends having pins 63 to enter peripheral grooves in the collar 64 fastened to the hollow or tubular shaft 47 as shown best in Fig. 5, the said walking beam serving to reciprocate the two hollow shafts 47 in opposite directions; that is to say as one of said shafts moves downward the other will move upward and vice versa. To one branch of the rocker or walking beam 62 is connected the pitman 65 having a split strap 66 at its lower end embracing the eccentric 67 on the shaft 68 supported by bearings 69 on the base or bed of the machine. Rigid with the shaft 68 is the spur gear 70 in mesh with the pinion 71 (see Fig. 6 for example) fastened to the shaft 72 also supported by said bearings, the ratio of the gears 71 and 70 being a two-to-one relation, the result being that the shaft 68 is rotated once to every two rotations of the shaft 72 for the reason that the plaiting mechanisms are duplicated, it being understood that said plaiting mechanisms receive their motion primarily from the shaft 68. Rigid with the shaft 68 is the pinion 68' in mesh with peripheral teeth on carrier 28 by which the latter can be rotated.

Fastened to the upper ends of the respective shafts 48 are tubes 73 having flanges 74 at their lower ends and surrounding said shafts and partly inclosed by said tubes, are coiled springs 75 engaging the upper ends of said tubes and the upper ends of the tubular shafts 47, the purpose of said springs being to exert a constant upward thrust to the sleeves or tubes 73 to thereby tend to maintain the ejecting and bottom forming heads 55 against the under side of the plaiting heads 46 as shown on the left in Fig. 5. It will be clear that when a downward thrust is imparted to either of the shafts 48 relatively to the companion shaft 47, the head 55 will be given a cup-blank-ejecting movement, and the means shown for securing this function will now be set forth.

Supported by bearings on the framework of the machine are actuating members 76 shown as levers pivoted between their ends. To the inner branches or tail portions of said levers are connected coiled springs 77 which are also connected to the framework of the machine, the purpose of which is to constantly maintain the outer or operative branches of said levers elevated. Said actuating members or levers 76 in the present instance receive their motion from the walking beam or rocker 62 there being preferably a lost motion connection in each case, so that the rocker can move a certain distance without operating the said levers. To the outer branches of the actuating members or levers 76 are jointed rods as 78 which depend therefrom and which extend freely through perforations in lugs or projections 79 projecting from opposite branches of the rocker 62, said rods being provided with stops 80 at their lower ends and which may as shown consist of holding and check nuts to thereby provide for adjustment.

It will be assumed that the parts are in the positions shown in Fig. 5. As the left branch or arm of the rocker 62 is moved downward in the manner already described, it shifts the tubular rod 47 downward, the shaft 48 moving therewith, this action continuing until the projection 79 strikes the stop 80 at which point the flange 74 on the left will have passed below the tip of the actuator 76, the blank at this time having been fully plaited. Beyond this point the left branch of the rocker has a further movement downward and on such motion the lug 79 acting against the stop 80 will draw the companion rod 78 and therefore the outer branch of the complemental lever 76 downward, so that said lever acting against the coöperating flange 74 can thrust the sleeve 73 and therefore the shaft 48 at the left downward, compressing the coöperating spring 75 and therefore moving the head 55 at the left downward so as to positively force the plaited cup from coöperating creasing or plaiting head 46. As the left branch of the rocker 62 is elevated the spring 77 on the left will return the lever 76 and the rod 78 connected therewith to its original position, while the spring 75 on the left will return the coöperating shaft 48 to its primary relation. A like operation will be repeated with the right branch of the rocker 62.

It will be remembered that I have hereinbefore mentioned die mechanism, and I provide means of a suitable nature for transferring the plaited cup blanks or partially finished cups, from the plaiting mechanisms to the die mechanism, said transferring mechanism being adapted to alternately take the plaited cup blanks from the plaiting mechanisms and to the die mechanism. The transferring means is shown in detail in Figs. 15, 16 and 17 and in operative relation with the other parts in Figs. 1, 3 and 5 also partly appearing in other views.

There are two transferring devices comprising respectively in their make up, arms or levers 85 and 86 supported for rocking motion by a substantially upright stationary shaft 87 rising from the bed or base 26. To the outer ends of the transferring arms or levers 85 and 86 are pivoted the shanks or bodies of substantially semi-circular gripper members or jaws 88 each pair of jaws when closed presenting approximately an annular structure and being adapted at such time to receive a plaited cup thrust thereinto from the plaiting mechanism on the downward movement of the ejecting head 55. In Fig. 15 the gripper members or jaws 88 on the right are shown as closed and are assumed to be under one of the plaiting mechanisms and in condition to receive a plaited cup-blank. It will be assumed that such a blank has been inserted between the closed jaws. When this occurs the arm or lever 86 is swung to the position shown by the arm 85 so that the plaited cup blank can be received by the die mechanism at about which time the jaws 88 on said arm 86 are opened. When the arm 86 is being operated to transfer a plaited cup blank to the die mechanism the arm 85 with its open jaws 88 is being moved into position to receive a plaited blank from the other plaiting mechanism and just before the second plaited cup blank is to be received, the jaws 88 on the arm 85 are closed so that the arm 85 can subsequently, with its plaited cup blank, be moved to discharging position. Mechanism is provided for automatically opening and closing the two sets of jaws and gripper members in proper sequence.

There is shown pivoted to the shank of each of the jaws 88 the rod or link 89, said rods or links being as will be understood arranged in pairs, one pair of rods being jointed to the arm 90 while the other pair is likewise connected with the arm 91, said arms 90 and 91 being loosely connected with the shaft or spindle 87 for relative movement with relation to the respective transferring arms or levers 85 and 86, so that when either of said arms 90 and 91 is operated relatively to a coacting arm 85 or 86, the jaws 88 carried by said coacting arm can be opened or closed.

The hub of the arm or lever 85 is rigid with the elongated sleeve 92 loose on the shaft 87 which has at its inner end a toothed segment 93 adapted to mesh with the reciprocatory rack 94, said rack 94 like companion racks hereinafter described being supported and guided at their inner ends by a bearing 95 made in the form of a casing carried by the bed 26. The rack 94 when moved in one direction, for instance toward the right in Fig. 15, will through the sector 93 move the arm 85 from a cup blank discharging position to a cup blank receiving position, and when moved in the opposite direction will reverse such action, so that said arm will be returned to its primary position. In the construction shown the motion of the rack is accomplished by cam and spring means, a cam such as that denoted by 96 being adapted to advance said rack 94 while the spring 97 connected with said rack and also with the framing of the machine is adapted to draw back said rack. The cam 96 is fixed to the shaft 68 and its active surface or rise is adapted to engage an anti-friction roller 98 on the rack 94 at the appropriate time so as to give to the arm 85 a swing through one-fourth of a circle during which the spring 97 is stretched whereby the spring when the active portion of the cam 96 passes off said roller 98, can return the rack 94 to its original position, and thereby return the arm 85 from a cup-blank receiving position to a cup-blank discharging position.

Supported and guided by the casing-like bearing 95 is a rack 99, the teeth of which mesh with a segment 100 fastened to the elongated sleeve 101 surrounding but loose with respect to sleeve 92 to which I have already referred. This sleeve 101, however, is rigid with the operating arm 90. The rack 99 is shown having rigid therewith a box-like member 102 provided with an anti-friction roller 103 coöperative with the cam 104 also fastened to said shaft 68, said cam 104 in connection with the spring 105 serving to reciprocate the rack 99 whereby said rack can operate the segment 100 and thereby through the intermediate parts, open and close in succession the jaws 88 of the transferring arm 85. The cam 104 is adapted to so operate the rack 99 as to effect the closing of the jaws 88 on the lever 85 while the spring 105 is adapted to open said jaws. In Fig. 15 the jaws 88 on the lever 85 are opened being maintained in such relation by the spring 105, this relation, however, will be changed as soon as the lever 85 reaches the cup receiving position or just about the time the active portion of the cam 104 will ride against the anti-friction roller 103 to impart an inward thrust to the rack 99 for operating the segment 100, the latter in turn acting upon the arm 90 and links 89 to close the jaws 88 of said lever 85. As the lever 85 returns to its original or cup-discharging position, the active portion of the cam 104 will pass off the anti-friction roller 103, so that the spring 105 through the intervening devices, can open the jaws 88 of the lever 85, this action occurring just before said lever reaches its initial position.

The lever 86 is equipped with exactly the same devices as have been described in connection with the lever 85, so that corresponding characters will be employed to denote similar parts therein. The cam, spring and other mechanisms therefore of the lever 86 need not be described as they have already been practically set forth in connection with the lever 85; I might add, however, that the sleeves in the casing 95 connected with the lever 86 and the operating arm 91 are of different lengths from the sleeves associated with the lever 85 and arm 90.

As already set forth the die mechanism comprises a carrier equipped with dies arranged in sets, the respective members of which are adapted to be relatively opened and closed and the transferring-devices to which I have already alluded introduce a plaited cup blank into the space between a pair of opened die members as shown for example in Figs. 12 and 13. These sets of die members are arranged in approximately annular order upon one face of the carrier 28 near the periphery thereof and each die comprises a relatively stationary female member denoted in a general way by 110 and a male die member denoted in a general way by 111. A detailed description of the construction and operation of one set of said die members will apply to the others and specific reference in this connection may be had to Figs. 12, 13 and 14. The die member 110 comprises a body section 112 rigid with the carrier 28 and a turnable section 113, the two parts having openings which register to present the tapered socket 114 the shape of which corresponds approximately with that of the cup to be made, the bottom of the socket being open for a purpose that will hereafter appear. The body section 112 is shown fastened to the carrier 28 by screws 115, while the turnable member 113 is held in assembled relation with the body section by angular clamping plates 116 attached to said body section 112 and overlying the companion turnable section 113. I might state that the object of turning the part 113 is to lock the two die members 110 and 111 to each other when occasion requires, such result being accomplished as will hereinafter appear by turning the part 113 with respect to the part 112 for instance by an actuating device engaging the projection 117 on said turnable die part 113.

The die member 111 involves in its construction the plunger 118 of substantially frusto-conical or outwardly-tapered construction agreeing therein with the shape of the cup to be made. Said plunger 118 is shown as rigid with the shank 119 rigid with the projection 120 on the slide 121, the carrier 28 having a radial slideway or rib to receive and guide said slide 121. Fitted around the shank or stem 119, is the sleeve 123 counterbored in its outer side to rigidly receive the ring 124 which I might explain at this time is to form a bead on or to densify the rim of the cup. Surrounding the outer portion of the shank or stem 119 is a coiled spring 125 bearing against the sleeve 123 and also against the plunger 118. The sleeve 123 also has several hook catch lugs 126 coöperative with the locking lugs 127 on the companion die member 110. As will hereinafter appear a cup is introduced into the space between the die members 110 and 111 while they are separated, the carrier 28 moving at this time, and when the blank has been introduced between the companion die members, the inner die member 111 is released and acting by gravity, falls so that the plunger 118 enters the blank, carrying the same outward, and into the opening or seat 114, the weight of the plunger 118 and the parts associated therewith, acting to flatten down the plaits on the exterior of the blank; in other words the action is a gravitative one, the plunger 118 and the parts which move therewith being made sufficiently heavy to insure complete flattening down of the plaits. After the plunger 118 has performed its function the die members 110 and 111 are locked together and practically at the same time the rim of the cup is compressed so as to form a bead as will hereafter appear. The two die members 110 and 111 when thus locked together travel in such condition through practically a complete circle and shortly before the circuit is completed, the die members are unlocked all as will hereinafter appear. When the die members 110 and 111 are unlocked the die member 111 is moved radially inward, preferably by cam means, and is then released, so that it can fall and perform by gravity, the result already set forth. To thus operate the die member 111, the fixed cam 128 is illustrated said cam having near its outer edge a race or groove 128' inwardly inclined or bent. After the die member 111 is unlocked from the companion die member 110 a projection 129 on the slide 121 will as the carrier 28 rotates, enter the advance end of the open-ended race or groove 128, the result being that the die member 111 is moved inwardly. When the projection 129 passes from the leaving end of the race 128', the die member 111 is released and can drop as already described. The projection 129 is adapted also to travel in a radial groove on the carrier 28 so as to properly guide the die member 111.

After the coöperating die members 110 and 111 are closed together upon the intermediate cup blank, the sleeve 123 is given an independent movement for a two-fold purpose one being to lock the die members together and the other to cause the ring 124 to compress the brim portion of the cup blank and for this purpose a member such as that denoted in a general way by 131 (see Fig. 1) is provided. This member 131 consists of similar plates 132 and 133, the plate 133 being rigid with the pitman or connecting rod 134. The two plates 132 and 133 are connected together by tie members or bolts 135 surrounding which are coiled springs 136 which constantly tend to yieldingly advance or move outward the plate 132, it being understood that the terminals of the two springs bear against said plates. The outer plate is adapted to directly act against the sleeve 123 to move the same outwardly to locking position and at the same time project the ring 124 into the rabbet 137 to press down the rim of the cup to make a bead or thickened portion thereon. When the lugs 126 have been moved by the member 131 to a point beyond the lugs 127 the die member 113 is turned by a suitable means engaging the projection 117, so as to lock together the respective sets of lugs. The connecting rod 134 has at its inner end a fork 138 straddling and guided by the block 139 loose on the shaft 27, said pitman or rod 134 having at its outer end the divided ring 140 embracing the eccentric 141 on the shaft 72. As the eccentric 141 rotates the pitman or connecting rod 134 is given a reciprocating movement, the compressing member 131 consequently moving through an orbital path and through practically one half of the movement of the member 131 in said path it is acting against and moving in the direction of movement of the sleeve 123, so that the compressing movement of the part 131 does not retard the action of the machine.

Fulcrumed at its elbow or angle, to the pitman 134 is the angle lever 142, the long arm of which has jointed thereto the rod 143, pivoted to the pitman 144 operable by the cam 145 on the shaft 72. After the sleeve 123 is moved to a point where it can be locked or where the catch lugs 126 can be engaged by the locking lugs 127, the link 143 will be drawn outward by the cam 145 and pitman 144, thereby correspondingly moving the long arm of the angle lever 142 and hence causing the short arm of said lever to engage against the projection of stud 117 on the sleeve 113 and turning said sleeve and consequently the locking lugs 127 whereby the latter are brought over the hooks of the catch lugs 126 to positively lock together the die members 110 and 111, this result being maintained until the said die members practically reach the cam 128 at which point said die members are unlocked. Pivoted to the frame-work of the machine, is the lever 148 to the short arm of which is jointed the rod 149 operable in one direction by the cam 150 on the shaft 72 and in the other direction by the spring 151, the cam and spring means acting to reciprocate said rod 149 and therefore oscillate the lever 148. Just before the locked together die members 110 and 111 reach the cam 128 the long arm of the lever 148 is caused to strike the stud 117 and therefore turn the sleeve 113 to disengage the locking lugs 127 from the catch lugs 126 immediately after which the die member 111 can be moved inwardly in the manner already described.

Rigid with the jaws or grippers 88, are the lugs or ears 152 (Figs. 12 and 13), which when said jaws are closed are approximately in lateral contact but which are cut away at their upper ends to produce the mouth 153 to receive the beveled portion of the positive jaw opening member 154 connected with the die-member 111, the action being such that this jaw opening member 154 will enter said mouth 153 at a point immediately preceding that in which the plunger 118 enters the cup blank so as to positively spread or open the two jaws 88 in case they should fail to be opened in the normal manner. Rigid with the shaft 72 is the gear 155 (Fig. 6) in mesh with the pinion 156 on the power shaft 157 equipped with a suitable driver as the pulley 158.

After the die members 110 and 111 are opened in the manner already described, an ejecting device as 160 (see Fig. 2) is adapted to forcibly remove the cup 200 from the die member 110 by being projected upwardly through the open bottom thereof. Said ejecting-device 160 has a limited motion with the carrier 28 being shown as supported by and in an opening of the block 161 mounted for traveling movement upon a flange 162 on the framework of the machine. This block has connected therewith the rod 163 movable in one direction by the spring 164 and in the opposite direction by the cam 165 on the shaft 72. Immediately after the die members are opened and separated the block 161 is caused to move in the direction of the carrier, the advancing motion of said block ceasing at about the point that the cup 200 is ejected from the outer die member 110 by the ejecting device 160 which is given an inward movement for such purpose. Pivoted to the block 161 at its elbow is an angle lever 166 the inner arm of which is cam shaped and which operates against the ejector, the other arm of said angle lever being jointed to the reciprocatory rod 167 movable in one direction by the cam 168 and in the other by the spring 169, the angle lever being so operated as to cause the cam branch thereof to push the ejecting device 160 inward just at about the time the die members 110 and 111 are separated.

Preferably the cups while being compressed to flatten down the plaits thereof are subjected to heat and this may be accomplished as shown by heating the carrier 28 for instance by steam as will now appear. Fitted in the elongated hub 28' of the carrier 28 is the non-rotary member or shaft 170 (as shown best in Fig. 4) to which is connected the steam supply pipe 171 discharging steam into the supply passage 172 of said shaft 170 the delivery end of said passage opening into the chamber 173 formed at one end of said hub 28'. Leading from said chamber 173 is the radial passage 174 which discharges the steam into the annular passage 175 (Fig. 1) within and near the periphery of said carrier 28, the discharge passage 176 practically diametrically opposite the passage 174, conducting the steam from said annular passage into the short passage 177 which registers at one end with the annular space 178 in the hub 28', the entering end of the discharge passage 179 in the non-rotary shaft 170 being opposite said annular space. Connected with the discharge end of said passage 179 is the discharge pipe 180.

I prefer to provide printing means for printing upon the cup suitable matter and that shown for such purpose will now be set forth. It will be remembered that the die members 110 have been described as open in their under or outer sides and the printing means as shown impresses upon the bottom of the cup blank through said opening. For this purpose I have shown the printing member 181 the two arms of which bear suitable characters which are adapted to print upon the bottoms of the cups through the openings of the die members 110 as the latter revolve. The printing characters on the arms of the printing member 181 are inked by the inking roller 182, the shaft 183 of which is carried by the bracket 184 on the framework of the machine. To the shaft 185 of the printing member 181 is fixed the pinion 186 in mesh with the teeth 68' on the carrier 28. It will therefore be clear that as said carrier rotates the printing mechanism is operated to thereby cause the printing member 181 to impress the bottom of the cups with the desired matter.

1. The combination of means for supporting a cup-blank, an annular member, a plaiting-head, said plaiting head and annular member being relatively movable to cause the forcing of the blank into said annular member and said head being provided with means for forming external plaits on the blank, and means for sweeping across said plaits as the blank is being relatively forced into said annular member, for flattening down said plaits.

2. The combination of means for supporting a cup-blank, an annular member, a plaiting-head, said plaiting-head and annular member being relatively movable to cause the forcing of the blank into said annular member, one of said parts having means for forming external plaits on the blank, and a plurality of spring fingers for sweeping across said plaits as the blank is being relatively forced into said annular member, for flattening down said plaits.

3. The combination of an annular member provided with inwardly-extending, laterally-spaced fingers, yieldable means for supporting a blank above said fingers, and a plaiting-head movable relatively into said annular member and provided with plaiting members movable into the spaces between said fingers.

4. The combination of an annular member provided with inwardly-extending, laterally-spaced fingers, spring devices for supporting a blank at one side of said annular member, and a plaiting head movable relatively into said annular member and provided with plaiting members movable into the spaces between said fingers and also adapted to move said spring-devices into said spaces.

5. The combination of an annular member provided with inwardly-extending, laterally-spaced fingers, a substantially frusto-conical plaiting head movable relatively into said annular member and provided with links hinged to the small end thereof, said head being longitudinally externally grooved and said links being movable into the spaces between said fingers and into the grooves of the head on the relative movement of said head an annular member, and springs arranged in annular order, for supporting the blank relatively to said fingers, said springs being movable into the spaces between the fingers on the relative movement of the head and annular member.

6. The combination of a rotary carrier, die members arranged in pairs and supported by said carrier, one each of the die members having an opening, a printing device supported independently of the carrier, and means for causing the printing device to successively print the cups through the openings in said die members.

7. The combination of a rotary carrier, a pair of die members supported by said carrier, one of said die members having an opening, and a printing device for printing on the part in said die members through said opening while said part is under the action of said die members and during the rotation of said carrier.

8. The combination of a rotary carrier, a pair of die members supported by said carrier, one of which has an opening, a printing device for printing on the part in said die members through said opening, and means operative by said carrier, for actuating said printing device.

9. The combination of a carrier, means for operating said carrier, die mechanism supported by said carrier, having an opening, a printing device, and means for causing said printing device to print on the article in said mechanism, through said opening.

10. The combination of a movable carrier, a pair of die members on said carrier, means for positively locking the die members together at a predetermined point, and means for unlocking said die members at a subsequent point, one of said die members when they are unlocked, being movable solely by gravity away from the companion die member.

11. The combination of a pair of die-members coöperative to permanently flatten down the plaits of a previously-plaited cup-blank, a carrier to which the die members are connected, means for moving said carrier, a bead-forming element on one of the die members, and means for operating said bead-forming element on the motion of said carrier.

12. The combination of a rotary carrier, a pair of die members on said carrier for acting on a cup-blank, a bead-forming element active against the marginal portion of the blank held by said die members, and means for imparting a working stroke to the bead-forming element during the rotation of said carrier and also in the direction of movement thereof.

13. The combination of a rotary carrier, a pair of die members on said carrier, for acting on a cup-blank, a bead-forming element active on the marginal portion of the blank held by said die members, and a swinging member provided with means for operating said bead-forming element.

14. The combination of a pair of die members coöperative to act upon a cup-blank, means for moving one of the die members away from the companion die member and then releasing the same said movable die member when released being movable solely by gravity into working relation with said companion die member, and means for forming a bead on the cup-blank, carried by said movable die member.

15. The combination of a rotary carrier, a pair of die members supported by said carrier and coöperative upon a cup-blank, a device carried by one of the die members, for compressing the marginal portion of the blank, and yieldable means active against said compressing device.

16. The combination of a rotary carrier, a pair of die members supported by said carrier and coöperative upon a cup-blank, a device carried by one of the die members, for compressing the marginal portion of the blank, yieldable means active against the compressing device, and means for causing the movement of said yieldable means in the direction of rotation of said carrier during the compressing operation.

17. The combination of a rotary carrier, a pair of die members supported by said carrier, a device for compressing the marginal portion of the blank while in the die members, and means for causing the compressing device to act and to swing in the direction of movement of the rotary carrier.

18. The combination of a rotary carrier, die members supported by said carrier for movement therewith and arranged in sets, means for locking the die members of the respective sets automatically together at a predetermined point in the movement of the carrier, and means for automatically releasing the sets of die members at another point in the travel of said carrier.

19. The combination of a rotary carrier, a pair of die members, mechanisms for locking together and afterward releasing said die members at predetermined points in the travel of the carrier, and means for positively withdrawing one of the die members away from the companion member when the same are released and for then freeing said die member thus withdrawn, said die member when thus freed being adapted to return solely by gravity into operative relation with said companion die member.

20. The combination of a rotary carrier, a pair of die members one of which is rigid with said carrier and the other of which is movable thereon, said die members being co-operative to act upon a cup-blank, one of the die members being in sections, one of said sections being rotative with respective to the other and having lugs, the other die member also having lugs, and means for rotating the rotary die member section to bring the two sets of lugs into locking relation.

21. The combination of a pair of die members, mechanism for relatively opening and closing said die members, an oscillatory arm having gripper fingers, means for forming a blank into cup shape and for positioning the same between the gripper fingers, means for opening and closing said gripper fingers at predetermined points in the movement of said arm, and mechanism for operating said arm, the latter being adapted to carry the cup blank into the space between the opened die members.

22. The combination of a rotary carrier, a pair of die members one of which is rigid with said carrier and the other of which is movable thereon, said die members being co-operative to act upon a cup-blank, the movable die member being in sections, one of said sections being rotary with respect to the other, and means for locking the sections of the movable die member together on their relative rotation.

23. The combination of a pair of die members, mechanism for relatively opening said die members, an oscillatory arm provided with gripper fingers adapted when closed to receive a blank in cup form, means for forming a blank into cup form and for presenting the same between said gripper fingers, said arm on its movement being adapted to carry the blank from the blank forming means to the space between the die members, and mechanism, including rack and pinion means, for opening and closing the gripper fingers.

24. The combination of a rotary carrier, die members on said carrier coöperative to flatten down the plaits of a previously-plaited cup-blank therein, a cup-ejecting member supported independently of the carrier, and means for causing said cup-ejector to eject the cup from the die members.

25. The combination of a movably mounted carrier, die mechanism on said carrier, comprising die members in sets, means for locking together and then unlocking the sets of die members, an ejecting device supported independently of the carrier, means for moving the ejecting device with the carrier for a portion of the movement of the latter, and means for operating the ejecting device on said movement to cause the same to successively discharge articles from the die members when in their unlocked relation.

In testimony whereof I affix my signature in presence of two witnesses.

WALTER E. CLAUSSEN.

Witnesses:
   CHAS. E. MILLER,
   CHARLES KEAN.